Figure 4:
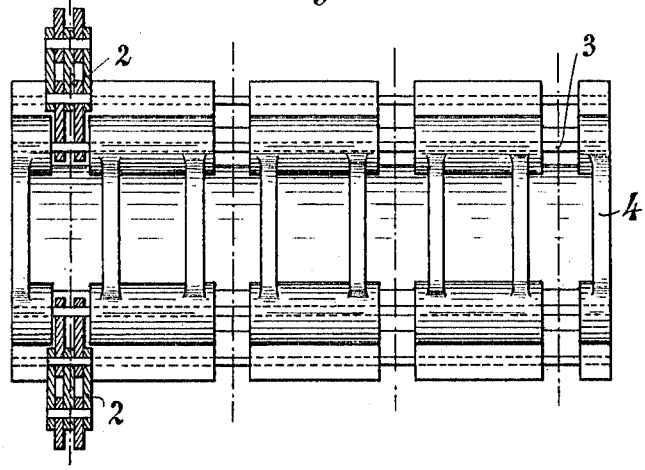

J. A. MEUNIER.
CUSHIONED PNEUMATIC TIRE.
APPLICATION FILED JAN. 18, 1912.
1,115,082.
Patented Oct. 27, 1914.
2 SHEETS—SHEET 1.
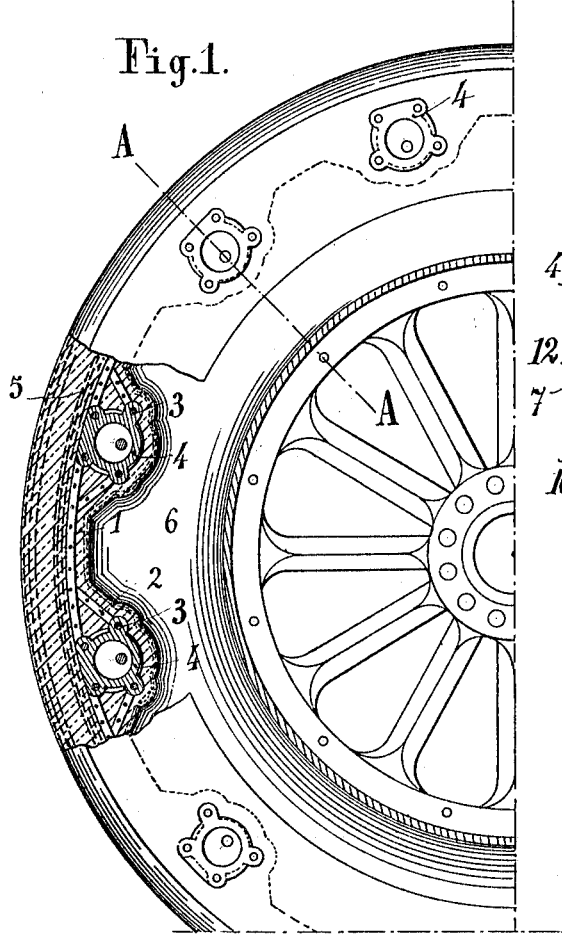
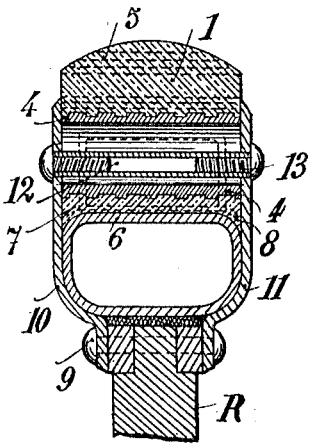
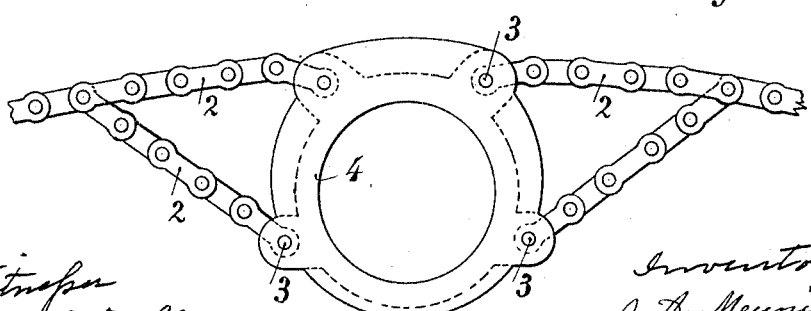

J. A. MEUNIER.
CUSHIONED PNEUMATIC TIRE.
APPLICATION FILED JAN. 18, 1912.

1,115,082.

Patented Oct. 27, 1914.
2 SHEETS—SHEET 2.

UNITED STATES PATENT OFFICE.

JULES ALEXANDRE MEUNIER, OF PARIS, FRANCE.

CUSHIONED PNEUMATIC TIRE.

1,115,082. Specification of Letters Patent. Patented Oct. 27, 1914.

Application filed January 18, 1912. Serial No. 672,012.

*To all whom it may concern:*

Be it known that I, JULES ALEXANDRE MEUNIER, a citizen of the Republic of France, residing at 43 Rue Laffitte, Paris, in the Republic of France, have invented certain new and useful Improvements in Cushioned Pneumatic Tires, of which the following is a specification, reference being had therein to the accompanying drawings.

This invention refers to a system of elastic absolutely unburstable pneumatic tires, that cannot be torn away from the wheel and capable of being used for all kinds of vehicles and serving for driving or transforming any existing types of wheels so as to give them the flexibility and the solidity which they are lacking. These transformations are effected by adapting to the said wheels a protected and flexible tread band, in one or more parts, that is to say which can be provided with internal protection or armoring embedded in the india-rubber, or with external and independent armoring. This tread band constitutes the essential feature of the invention. A great number of systems have been tried up to the present but have not given any satisfactory results because they were based more particularly on obtaining the elasticity by decentering the component parts of the wheel, and consisted in the use of rigid metal circles producing constant vibrations of the vehicle, entailing an inferior output, a loss of power and premature wearing away, all of which are capable of occasioning serious accidents.

The arrangement forming the subject matter of the present invention differs completely from these systems and its working reminds one of that of the ordinary pneumatic tire. Its principle of elasticity is as with these latter tires based on the partial crushing of the tire. This crushing which is only effected at the actual point of contact of the tire with the obstacle in nowise decenters the wheels and consequently does not occasion any vibration of the vehicle.

The essential feature of the invention consequently comprises in the first place the system of its elastic independent, separate and inextensile tread band which guarantees an absolute peripheral protection of the tube, while at the same time the tube retains all its elasticity and its liberty of action when absorbing the obstacle but without decentering the wheel.

The secondary features are the means of connecting together the tread band and the lateral projecting flanges.

The subject matter of the invention comprises two distinct portions:—1. The armored, separate, inextensile and elastic tread band, the essential feature and capable of being used separately for modifying existing wheels. 2. The lateral protection formed either by connecting two flanges to the wheels or by a circular metal trough in a single piece. Like the ordinary pneumatic tires this system also comprises an inner air tube.

Figure 5:
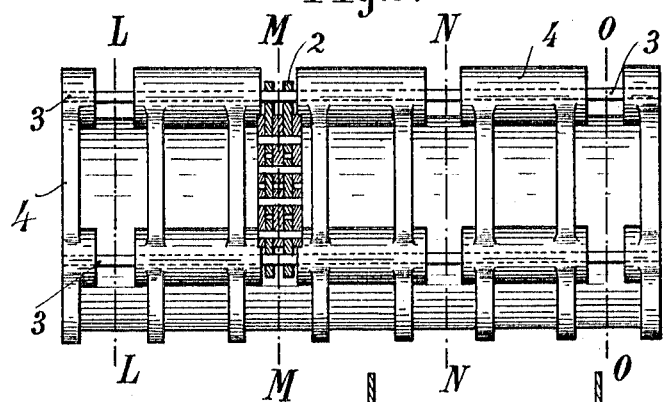
Figure 6:
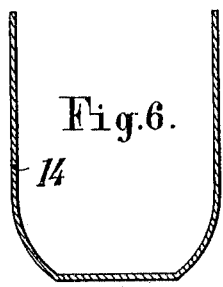
Figure 7:
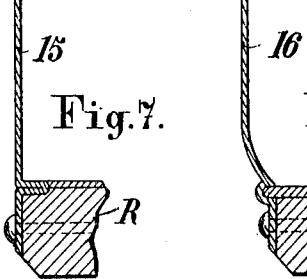
Figure 8:
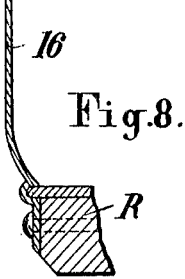

Referring to the accompanying drawings:—Figure 1 is a side elevation of half a wheel, one of the flanges of which has been removed so as to show the interior. Fig. 2 is a cross section of Fig. 1 along the line A—A. Fig. 3 is a side view of the armoring, (sleeve and chains). Fig. 4 is a plan of Fig. 3. Fig. 5 is a side view of a driving sleeve and of a portion of chain. Fig. 6 is a section on a reduced scale of a metal trough of a single piece which can be used instead of the flanges. Figs. 7 and 8 are side views of different forms of flanges which can also be employed in carrying out the present invention.

This tire essentially consists of an absolutely separate and rigorously elastic tread band 1 made of india-rubber in which canvas or the like is preferably embedded and provided internally with a metal elastic armoring preferably consisting of chains 2 of any system fastened by pins 3 or by other suitable means to metal sleeves 4 and the whole arranged so as to form a continuous circle, the elements of which are covered over by canvas or like bands 5 for assuring the absolute homogenity of the armoring with the india-rubber forming the tread band. The metal and elastic armoring may also be formed by connecting flexible cables with the sleeves 4. This is for the purpose of assuring the invulnerability of the tread band so as to prevent its bursting and rendering it as inextensile as possible, while at the same time it retains its absolute elasticity as well as every latitude of deformation when traveling over the road. The tread band 1 thus formed peripherally incloses the air tube 6 which it thus protects from any external or internal accidents and guarantees it consequently an absolute invulnerability. It terminates laterally in tongues or overlaps 7 and 8 for the purpose of preventing any nipping of the air tube which might be produced when traveling owing to the deformation imparted to the said tread band by the road. Being absolutely separate, flexible and independent this tread band is only held stretched by pumping up the air tube 6. It is situated at the interior of the metal trough formed by connecting two metal flanges 10 and 11 to the wheel R by any suitable means such as bolts 9, screws or rivets and the like, so as to constitute a lateral protecting shield for the air tube. The rotation of the tread thus formed is assured by the stay tubes 12 situated at the interior of the sleeves 4. These tubes 12 limit the movements of the sleeves 4. These stay tubes 12, the outer diameter of which is much less than the inside diameter of the sleeves 4 are mounted in the flanges 10 and 11 to which they are fastened by screws 13.

It is evident that according to the kind of vehicle to which the system is adapted and according to the work that it should effect and so on, the shapes and arrangements of the parts may vary indefinitely; for example the flanges 10 and 11 may be substituted by a metal trough 14 in a single piece, as shown in Fig. 6. The stay tubes can be substituted by simple screw bolts provided or not with counter nuts. For chain forming the armoring flexible metal cables, a coat of mail, wire gauze, or any other flexible metal armoring may be substituted, or finally flexible armoring formed of cords or hemp or flax bands sufficiently strong and arranged in suitable manner for carrying out the idea of the present invention may be used. The rubber of the tread can be substituted by leather or any other flexible or suitable materials.

Figs. 7 and 8 show two forms of flanges 15, 16 adapted to the wheel R. The chains 2 forming the armoring can vary indefinitely; they can be of indefinite number according to the lines L—L, M—M, O—O, and also in the form of a continuous circle and fastened by any suitable means.

What I claim and desire to secure by Letters Patent of the United States is:—

A pneumatic tire for vehicle wheels comprising in combination an elastic and separate tread band of suitable material, internal armoring therefor comprising a plurality of flexible chains, metal sleeves to which said chains are connected, said chains being covered by windings of canvas or the like and embedded in the rubber so as to constitute a homogeneous mass, metal flanges on the wheel, an inner air tube arranged between said metal flanges and between the said tread band and the wheel rim, and means extending through said flanges and engaging the said sleeves in the tread band for preventing its rotation.

In testimony whereof I have hereunto set my hand in presence of two subscribing witnesses this 13th day of December, 1911.

JULES ALEXANDRE MEUNIER.

Witnesses:
MARCEL TANDER HAPY,
H. O. CORE.